Jan. 4, 1949.                E. A. EAKINS                2,458,152
               PLASTIC RIVET AND METHOD OF MAKING SAME
                        Filed April 3, 1945
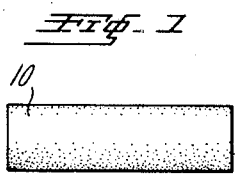
PLASTIC BAR
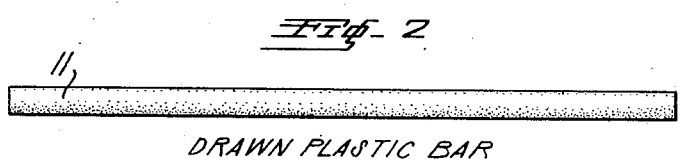
DRAWN PLASTIC BAR
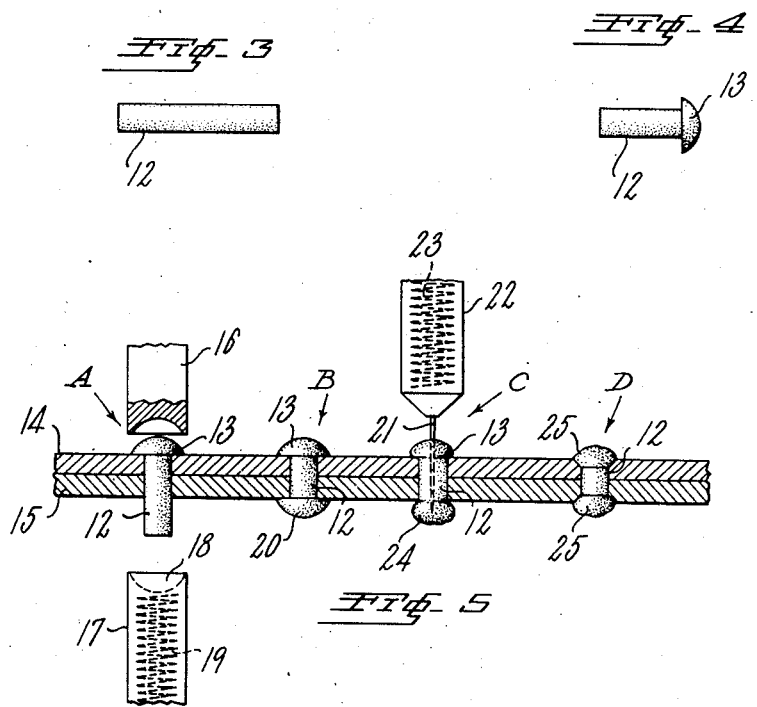
                                           INVENTOR.
                                       EVERETT A. EAKINS
                                    BY
                                       Lester J. Buslong
                                               ATTORNEY Patented Jan. 4, 1949

2,458,152

UNITED STATES PATENT OFFICE 2,458,152

PLASTIC RIVET AND METHOD OF MAKING SAME

Everett A. Eakins, Mishawaka, Ind., assignor to United States Rubber Company, New York, N. Y., a corporation of New Jersey Application April 3, 1945, Serial No. 586,331

3 Claims. (Cl. 18—59)

This invention relates to plastic rivets formed of a mixture of rubber and resin and having the unique property of contracting longitudinally a substantial amount when heated. The invention also relates to the method of making such rivets.

Metal rivets are used in vast quantities to secure sheets or plates together and to fasten one object to another, and when both faces of the work to be riveted are readily accessible, it is a simple operation to set a rivet so as to form a head at the inner end of the rivet and at the same time shorten the shank of the rivet so as to draw the objects being riveted firmly together. The usual way of setting such rivets is to place a backing block against the head of the rivet while pressure or blows are delivered to the other end of the rivet to spread it laterally.

When however, access cannot be had to the inner face of the work to be riveted it may be necessary to resort to what is known as blind riveting, whereby the inner end of the rivet is expanded or set while operating entirely from the opposite end or head of the rivet.

One method of blind riveting proposed heretofore is to place an explosive charge in the shank of the rivet near the end to be expanded and then set off the charge when the rivet is in place. Another method proposed heretofore is to provide the rivet with a hollow shank so that an hydraulic fluid may be forced into the hollow shank to expand the inner end of the rivet to spread it laterally.

These types of blind rivets are open to the objection that the means employed to set or expand the inner end of the rivet does not serve also to shorten the shank of the rivet and draw the objects being riveted firmly together, and unless such shank is shortened a loose riveting operation is likely to result.

The present invention relates to plastic rivets rather than metal rivets, and an extremely important feature of the present plastic rivet resides in its property to contract longitudinally a substantial amount when heated so that this contractive force may be utilized to draw the objects being riveted firmly together. Another important feature of the present invention resides in the property of the present rivet to expand laterally a substantial amount upon the application of heat, whereby a head may be formed upon one or both ends of the rivet by the application of heat along without the necessity of exerting external pressure against the end of the rivet to set or expand the same.

As will be apparent from the foregoing it is usually desirable in riveting to expand or head up the inserted end of the rivet and at the same time shorten the shank of the rivet so as to force the objects being riveted firmly together. The plastic rivet contemplated by the present invention will when heated expand laterally and contract longitudinally. This will serve to head up the inserted end of the rivet where it protrudes from the work and contract the shank longitudinally to draw the objects being riveted firmly together, and since these results may be secured by the application of heat alone, the present rivet is well adapted for use as a blind rivet as the heat can be supplied without having access to the protruding inner end of the rivet.

While the present plastic rivet is well adapted for use as a blind rivet, it may also be employed in other fields such for example as that of securing non-metallic plates or other parts together where, for example, metal cannot be used because of the corrosive action of the chemicals which may contact the parts that are riveted. The plastic rivet of the present invention may also be used to rivet glass plates together or other parts where it is desired to employ rivets having less rigidity and a greater cushioning action than the ordinary metal rivet. Still another field of use for the present rivet is in sand-blasting as the present plastic rivet will withstand the cutting action of a sand-blast much better than a metal rivet.

The unique properties of the present rivet are secured by intermixing a rubber and a thermoplastic resin and then vulcanizing or partly vulcanizing the rubber of this mixture so that if a piece of this vulcanized material is later distorted it will tend to return to the shape in which it was vulcanized. A piece of the vulcanized material is then heated to the softening point for the resin and while hot is stretched several hundred per cent and allowed to cool. The cooling causes the resin to set and retain the rubber in the stretched condition and under tension. When this material is again heated to the softening point of the resin the softened resin will permit the rubber to contract longitudinally and expand laterally as the material returns to its former shape in which it was vulcanized.

That is, the plastic material used to form the rivet of the present invention is given what is known as an "elastic memory" and the rivet is made by distorting the material from the shape in which it was vulcanized so that when the material is heated its elastic memory will cause it to contract longitudinally and expand laterally as above described.

The above and other features of the present plastic rivet and the method of making the same will be more fully understood from the following description when read in connection with the accompanying drawing wherein:

Fig. 1 is a side view of a short length of a round plastic bar formed of a mixture of rubber and resin.

Fig. 2 is a similar view showing the bar of Fig. 1 as having been stretched several hundred percent.

Fig. 3 is a side view of a piece of rivet-forming stock which has been cut from the longer bar shown in Fig. 2.

Fig. 4 is a side view of a rivet produced by forming a head upon one end of the stock shown in Fig. 3, and Fig. 5 is a sectional view through two plates riveted together and having various embodiments of the rivets contemplated by the present invention associated therewith.

The plastic bar 10 shown in Fig. 1 of the drawing is preferably produced by mixing together a rubber such as natural or synthetic rubber and a thermoplastic resin of a type which will be hereinafter described, and by adding thereto a vulcanizing agent such as sulphur. These materials are preferably thoroughly mixed in an open mill at a temperature near 120° F. After sufficiently mixed the material is sheeted out from the open mill to produce a sheet of the desired thickness. Such sheet is then cut into strips which should be approximately square in cross section. These strips are then preferably molded into round bars and while in this molded condition are cured for 20 minutes at about 275° F. to thereby produce cured plastic bars one of which is shown in Fig. 1.

This bar 10 is then heated to approximately 160° F. and while hot is stretched longitudinally to three or more times its previous length, and is allowed to cool while held in this stretched condition to form the rigid plastic bar 11 of Fig. 2 of the drawing. This bar 11 will have the so-called elastic memory of its previous shape shown in Fig. 1.

The size imparted to the bar 11 will, of course, depend upon the size of the shank to be given the finished rivets made from such bar. The rivet stock 12 is cut from the bar 11 and the length of such stock will depend upon the length desired in the finished rivet after one end has been enlarged to form the head 13 as shown in Fig. 4.

The head 13 is preferably formed by placing the stock 12 in a mold, not shown, but which is shaped to confine all portions of the stock 12 except a protruding end, whereupon this stock is heated, preferably by heating the mold, and a head molding plate is forced against the protruding end of the stock 12 so as to impart to such end the molded head 13. The other portions of the rivet will retain the previous dimensions because of the confining action of the mold.

In Fig. 5 of the drawing there are shown the sheets or plates 14 and 15 which may be formed of metal, glass, plastic or other more or less rigid material. These plates are shown as provided with several aligned holes through which the shank 12 of the rivet of Fig. 4 may be inserted. The two strips 14 and 15 are shown as having four rivets inserted therethrough and these rivets may be regarded as forming the views A, B, C and D.

Fig. 5—A shows the rivet of Fig. 4 inserted through aligned holes in the sheets 14 and 15 and as having a backing block 16 in position to be held in engagement with the head 13 while the other end of the rivet is to be headed up by pressing thereagainst the heated bar 17 having the head forming recess 18. This bar may be maintained at the desired elevated temperature to soften the rivet by the heating coils 19 or by other means. It will be apparent that if the heading bar 16 and heated bar 17 are held in engagement with the opposite ends of the rivet for a short length of time the inner end of this rivet will become soft and spread laterally under the action of the heat and pressure to form the rounded head 20 shown in Fig. 5—B.

Should the inner end of the rivet be inaccessible after it has been inserted through the plates 14 and 15, it then becomes what is known as a blind rivet wherein it is necessary to head up the inner end of the rivet when access can be had to only the head portion 13 thereof. This may be done by forcing a needle 21 deep into the rivet through the head thereof as shown in Fig. 5—C. The needle should be maintained in a hot condition say at approximately 180° F., and is shown as mounted in the supporting bar 22 which may be electrically heated as indicated at 23. The hot needle 21 will heat the rivet 12, 13 throughout most of its length and this will cause the inner protruding end thereof to expand laterally and contract longitudinally as above described and form the head 24.

The rivet contemplated by the present invention may be set or headed up in still another manner as shown in Fig. 5—D wherein it is assumed that the rivet is produced by simply inserting the stock 12 shown in Fig. 3 through the aligned holes in the plates 14 and 15 which plates are heated to a temperature of about 160° F. This heat alone will serve to head up both ends of the rivet since the heat will cause the ends of the rivet which protrude beyond the plates 14 and 15 to expand laterally and form the heads 25.

The elastic natural rubbers used may include natural rubber, guayule, balata or gutta percha. The synthetic rubbers used may include Buna S, Buna N, Hycar–OR–15, neoprene or butyl, etc.

The thermoplastic resins used may be cyclicized rubbers such as Marbon B, or it may be cyclicized balata, Marbon S, isolac or Plioform etc.

The rubber and resin used to form the plastic bar 10 should be compatible and should mix well when the resin is heated to its softening point, and curatives, accelerators and the like may be added.

Hycar–OR–15 is a modified copolymer of butadiene and acrylonitrile made by the Hycar Chemical Company of Akron, Ohio, Marbon B is a hard thermoplastic, resinous material which is made of purified cyclicized rubber disclosed in the McKenzie U. S. Patent No. 2,230,359 and manufactured by Marbon Corporation of Chicago, Illinois. Marbon S is a hard thermoplastic resinous polymerization product of butadiene-1,3 with a material polymerizable therewith such as styrene, and acrylonitrile, and is manufactured by the Marbon Corporation of Chicago, Illinois. Isolac is a thermoplastic material derived from rubber and disclosed in the Williams U. S. Patent 2,158,-530. Plioform is modified isomerized rubber or thermoplastic resin disclosed in the Bruson U. S. Patent 1,797,188.

The following example is given as illustrating one good practical compound for making the plastic material of which the bar of Fig. 1 is formed.

Example

|  | Pounds | Ounces |
|---|---|---|
| Marbon B (Resin) | 30 |  |
| #1 Pale Crepe | 12 |  |
| Stearic acid |  | 6 |
| Agerite White |  | 4 |
| Zinc oxide | 1 | 3 |
| Altax (accelerator) |  | 4 |
| Sulfur |  | 1 |

The elastic rubber (natural or synthetic) thermoplastic resin and other ingredients of the example are thoroughly mixed at a sufficiently high temperature to soften the resin. The material is then sheeted out and the sheet is cut into strips as above mentioned to form the bar 10.

It will be seen from the foregoing that a normally rigid plastic rivet such as herein described will, upon the application of heat alone, spread laterally to cause its ends to head up, and contract longitudinally in a highly desirable manner to draw such heads closer together.

Having thus described by invention, what I claim and desire to protect by Letters Patent is:

1. A normally rigid plastic rivet that will contract longitudinally a substantial amount when heated, said rivet being formed of vulcanized elastic rubber that is in a high elastic tensioned state and having intermixed therewith uniformly throughout the rivet a substantial amount of a thermoplastic resin that is compatible with the rubber and which is rigid at room temperatures and in this condition holds the tensioned rubber stretched axially of the rivet, so that when the rivet is heated sufficiently to render the resin soft the rubber will cause the rivet to contract longitudinally a large amount and expand laterally to set when cooled in this condition.

2. The method of riveting parts together which consists in providing a normally rigid rivet formed of a mixture of rubber and resin the latter being thermoplastic and compatible with rubber and rigid at room temperature and the rubber being vulcanized and elastic and under tension longitudinally of the rivet and held in this condition by the rigid condition of the resin so that the rivet has a pronounced elastic memory, inserting the rivet through confining holes in said parts to protrude therefrom, and then heating the rivet to cause its protruding end to expand laterally as the resin softens to form a rivet head and contract longitudinally to draw said head firmly against one of said parts.

3. The method of riveting parts together by a blind riveting operation which consists in providing a normally rigid rivet formed of a mixture of rubber and resin the latter being thermoplastic and compatible with rubber and rigid at room temperature and the rubber being vulcanized and elastic and under tension longitudinally of the rivet and held in this condition by the rigid condition of the resin so that the rivet has a pronounced elastic memory, inserting the rivet through confining holes in said parts to protrude therefrom, and then causing such protruding end to head up by the application of sufficient heat through the body portion of the rivet to such end to soften the resin therein.

EVERETT A. EAKINS.

REFERENCES CITED

The following references are of record in the file of this patent:

UNITED STATES PATENTS

| Number | Name | Date |
|---|---|---|
| 1,122,280 | Kempshall | Dec. 29, 1914 |
| 1,974,160 | Peirson | Sept. 18, 1934 |
| 2,027,962 | Currie | Jan. 14, 1936 |
| 2,182,996 | Shepherd | Dec. 12, 1939 |
| 2,209,403 | Kittner et al. | July 30, 1940 |
| 2,221,316 | Shepherd | Nov. 12, 1940 |
| 2,234,994 | Vernon et al. | Mar. 18, 1941 |
| 2,252,504 | Hahn | Aug. 12, 1941 |
| 2,328,708 | Cook et al. | Sept. 7, 1943 |
| 2,343,983 | Knowlton | Mar. 14, 1944 |
| 2,366,274 | Luth et al. | Jan. 2, 1945 |
| 2,377,928 | Fielitz et al. | June 12, 1945 |
| 2,414,011 | Billner | Jan. 7, 1947 |

OTHER REFERENCES

Marbon B in Rubber and Synthetic Compounds, by Marbon Corporation, pp. 3–5, Gary, Ind. Published Oct. 33, 1941. Copy in Div. 50—T. S. 1892 M183.